United States Patent [19]

Shin et al.

[11] Patent Number: 5,254,254
[45] Date of Patent: Oct. 19, 1993

[54] BIOLOGICAL METHOD OF TREATING WASTEWATER IN BATCH WITH POROUS BIOMASS CARRIER

[75] Inventors: Hang Sik Shin, Seoul; Heoung S. Park, Kyonggi, both of Rep. of Korea

[73] Assignee: Korea Advanced Institute of Science and Technology, Taijeon, Rep. of Korea

[21] Appl. No.: 790,162

[22] Filed: Nov. 12, 1991

[30] Foreign Application Priority Data

Jan. 26, 1991 [KR] Rep. of Korea .............. 91-1332

[51] Int. Cl.[5] .............. C02F 3/10; C02F 3/30
[52] U.S. Cl. .............. 210/616; 210/618; 210/630
[58] Field of Search .............. 210/616–618, 210/605, 614, 620, 630, 631

[56] References Cited

U.S. PATENT DOCUMENTS

| | | | |
|---|---|---|---|
| 4,160,724 | 7/1979 | Laughton | 210/7 |
| 4,162,153 | 6/1979 | Spector | 71/12 |
| 4,479,876 | 10/1984 | Fuchs | 210/616 |
| 4,500,429 | 2/1985 | Reimann et al. | 210/616 |
| 4,521,311 | 6/1985 | Fuchs et al. | 210/616 |
| 4,566,971 | 1/1986 | Reimann et al. | 210/616 |
| 4,655,925 | 4/1987 | Tabata et al. | 210/605 |
| 4,705,634 | 11/1987 | Reimann et al. | 210/616 |
| 5,126,042 | 6/1992 | Malone | 210/616 |

FOREIGN PATENT DOCUMENTS 0346013 2/1989 European Pat. Off. .
WO88/08410 11/1988 PCT Int'l Appl. .

*Primary Examiner*—Thomas Wyse
*Attorney, Agent, or Firm*—Burns, Doane, Swecker & Mathis

[57] ABSTRACT

An improvement in the biological method for treating wastewater is provided. The method is featured by adding to the reactor an amount of floating porous biomass carrier which can be mixed thoroughly with the wastewater to be treated. By the utilization of the carrier, the microorganisms can be retained in the reactor in a high concentration and the mass transfer can be adjusted so that various phases of microorganisms are provided within the reactor. The method is also characterized in that the reactor is operated under aerobic, anoxic and/or anaerobic conditions which are sequentially provided in an appropriate order depending on the type of pollutant to be treated. The method can remove organic substances, and nitrous and phosphorus materials effectively in a single reactor, and reduce the volume of the resultant sludge and the capital investment greatly as compared with the prior art methods.

9 Claims, 3 Drawing Sheets

BIOLOGICAL METHOD OF TREATING WASTEWATER IN BATCH WITH POROUS BIOMASS CARRIER

BACKGROUND OF THE INVENTION

1. Field of the Invention

The present invention relates to an improvement in a biological method of treating wastewater. More particularly, the present invention relates to a biological method of removing dissolved organic substances, and nitrous and phosphorus materials present in wastewater efficiently in a batch reactor containing porous biomass carriers.

2. Description of the Prior Art

In general, wastewater includes organic substances, nitrous and phosphorus materials, and the like, which serves as a nutrient source necessary for certain microorganisms to carry out their metabolism. The methods utilizing this type of biological function of the microorganisms in the field of wastewater treatment are called "biological methods for treatment of wastewater."

Conventionally, the methods involving the treatment of wastewater comprises transferring pollutants such as organic substances, and nitrous and phosphorous materials into microcells or converting these pollutants into environmentally innoxious form through a biological reaction, and separating the resultant microbes and innoxious product from the wastewater for disposal.

A wide variety of microorganisms and environmental conditions can be utilized depending on the type of the pollutant to be treated. For example, organic substances are converted into carbon dioxide and water by the action of heterotrophic microorganisms intaking such organic substances as a carbon source under aerobic conditions, and into methane, carbon dioxide, hydrogen, water, etc., under anaerobic conditions. Nitrogen is converted into oxidative nitrogen such as nitrite or nitrate by nitrifying bacteria under aerobic conditions. However, under anoxic conditions (i.e., under dissolved oxygen free conditions), nitrogen is converted into an innoxious form such as nitrogen or nitric acid gas through a denitrification reaction by the action of heterotrophic microorganisms. Phosphorus is uptaken in the form of a dissolved phosphorus by a bacteria having phosphorus accumulating capacity, and accumulated therein in the form of granules under an aerobic conditions. However, the phosphorus granule thus accumulated are released from the microorganisms in the form of a dissolved phosphorous under anaerobic condition (i.e., under dissolved oxygen and nitric acid free conditions).

In order to maximize the efficiency of the biological treatment of wastewater, it is necessary to choose proper microbes depending on the type of pollutant to be treated and provide suitable environmental conditions for growth to enhance the microbial activity, as well as increasement in the amount of microorganisms within the reactor.

Several methods have been hitherto proposed in attempt to enhance the activity of microorganisms used. According to one of these methods, the reactor is partitioned spatially so as to provide efficient conditions for the growth of the microorganisms. However, this method has drawbacks that it requires broad spaces of the treatment facilities and, therefore, enormous capital investment for constructing the treatment facilities. Furthermore, the method suffers from the defects that the manipulation of treatment facilities is grossly complicated.

As an improvement of this method, it has been proposed to increase the concentration of microorganisms by recycling the produced microorganisms or adding a biomass carrier to the partitioned reactor. This improved method could reduce the required treatment facilities spaces to some extent. However, it still requires broad spaces for treatment facilities, resulting in higher capital investment.

Another approach was a slurry type treatment method using a batch reactor, in which the reaction conditions are changed with the lapse of time by controlling the amount of dissolved oxygen. However, this method could not increase the concentration of microorganisms to above 5,000 mg/L because the sedimentation for separating the resultant sludge from the treated wastewater must also be carried out in the same reactor. Thus, this method is not suitable for treating a large volume of wastewater.

In addition, separation of the surplus sludge from the treated wastewater has been carried out mainly by a gravitational sedimentation method or a floatation method. However, the resultant sludge has a low concentration and, thus, this type of separation method must be accompanied by expensive, additional treatment procedures in order to attain the resultant sludge in a high concentration.

SUMMARY OF THE INVENTION

An object of the invention is to provide an improved biological method of treating wastewater in which pollutants such as organic substances, and nitrous and phosphorus materials contained in the wastewater can be effectively removed in a single reactor.

Another object of the invention is to provide an improved biological method of treating wastewater which can maximize the activity of microorganisms used, thereby the size of the equipment for wastewater treatment being reduced greatly and the treatment procedures being simplified.

Yet another object of the invention is to provide an improved biological method for treating wastewater which produces sludges in a high concentration, and thus which is suitable for the treatment of a large volume of wastewater and can reduce the cost for the subsequent treatment of sludges.

A further object of the invention will become apparent through reading the remainder of the specification.

These and other object of the invention can be achieved by the method according to the present invention, wherein an amount of floating porous biomass carrier is added to a batch reactor so that microorganisms are retained in a high concentration and aerobic, anoxic and/or anaerobic conditions are provided within the reactor in an appropriate order depending on the type of pollutant to be treated.

According to the present invention, the floating porous biomass carrier which can be mixed thoroughly with wastewater is added to a batch reactor. This type of floating porous biomass carrier can render the microorganisms retained in a high concentration and enhance the efficiency of mass transfer without being affected greatly by the increasement of shear stress of the fluid within the reactor.

The biomass carrier according to the present invention should not be decomposed by the microorganisms used and has a sufficient durability to use it repeatedly after removing the sludge. The biomass carrier may be in the form of a cube having a side length of 0.5 to 2.0 cm or in the form of a corresponding sphere. The microorganism carrier has a density of 0.1-1.0, a porosity of 40-98% and a pore diameter of 10-3,000 μm. The biomass carrier is usually produced from polymeric materials. Other materials having adsorbability or ion exchange capacity can be mixed with the polymeric materials depending on the type of pollutant to be treated.

The biomass carrier according to the present invention restricts the transfer of materials such as oxygen, resulting in various microbial phases. For example, even under an aerobic condition, the interior of the biomass carrier can remain in an anoxic or alkaline state. Attributing to this property, the time required for the subsequent treatment can greatly be reduced.

The biomass carrier according to the present invention may be added to the reactor in an amount of 5 to 40% by volume, preferably 10-30% by volume based on the volume of the reactor, depending on the type of pollutant to be treated.

BRIEF DESCRIPTION OF THE DRAWINGS

The present invention will be described in greater detail with reference to the drawing figures, wherein.

DETAILED DESCRIPTION OF THE INVENTION

Figure 1:
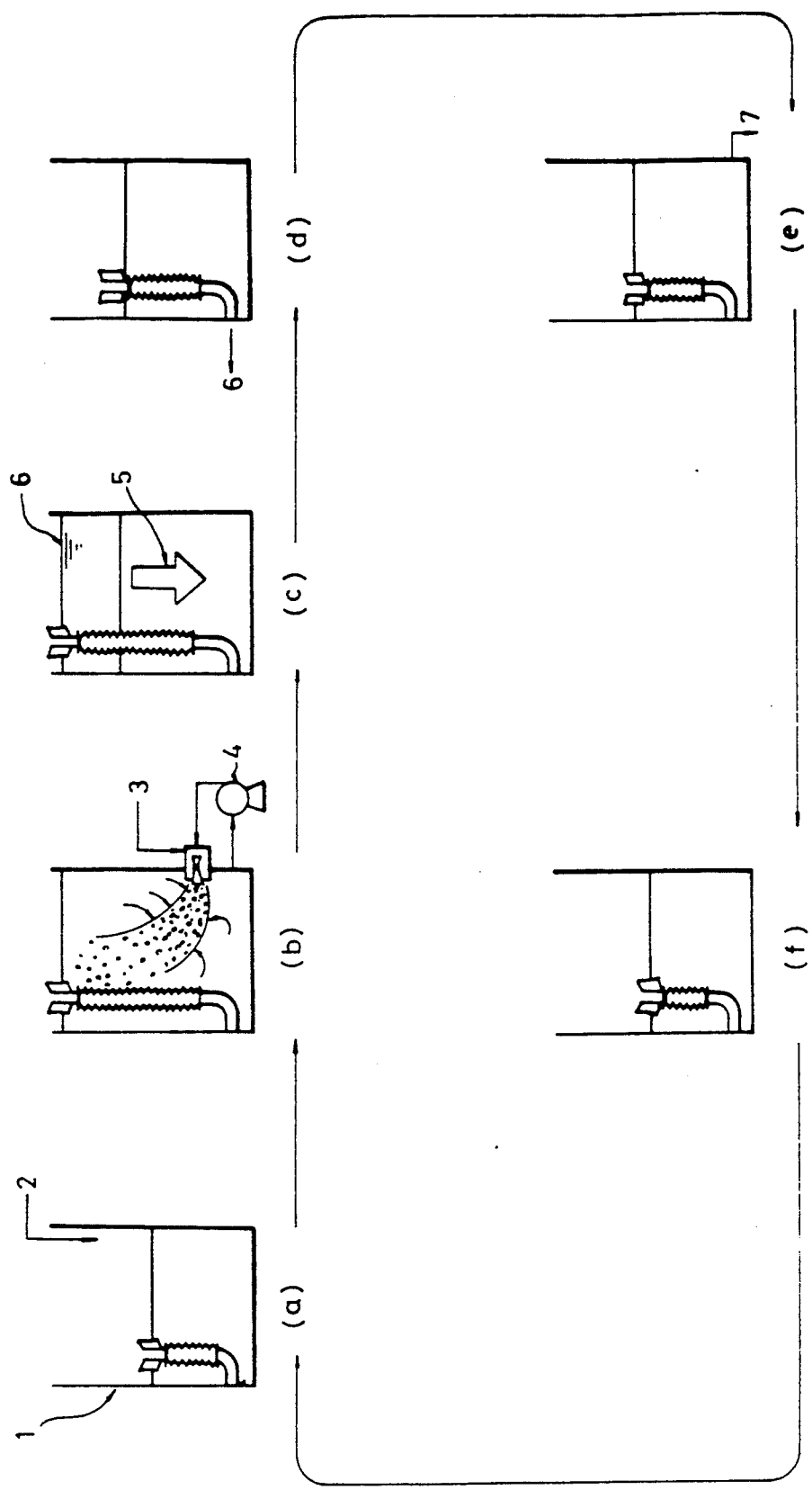
FIG. 1 is a flow diagram illustrating an example for the prior art biological method for treating wastewater using a batch reactor of the slurry type.

An embodiment of the prior art biological method using a conventional batch reactor is illustrated in FIG. 1.

The prior art method comprises the following steps a) to f), as diagramatically shown in FIG. 1. Wastewater 2 to be treated is introduced into a reactor 1 (Step a). The wastewater and microorganisms are mixed thoroughly by an aid of air 3 blown into the reactor from the bottom by an air pump 4, and then subject to a biological reaction (Step b). The resultant mixture is separated into two layers by sedimentation (Step c). After the separation, the supernatant wastewater 6 is drained from the reactor (Step d). Then, a portion of the sludge 1 which remains as the lower layer is removed form the reactor (Step e). Upon completion of removing the sludge, the reactor is allowed to stand until a fresh wastewater is introduced for the next run.

Figure 2:
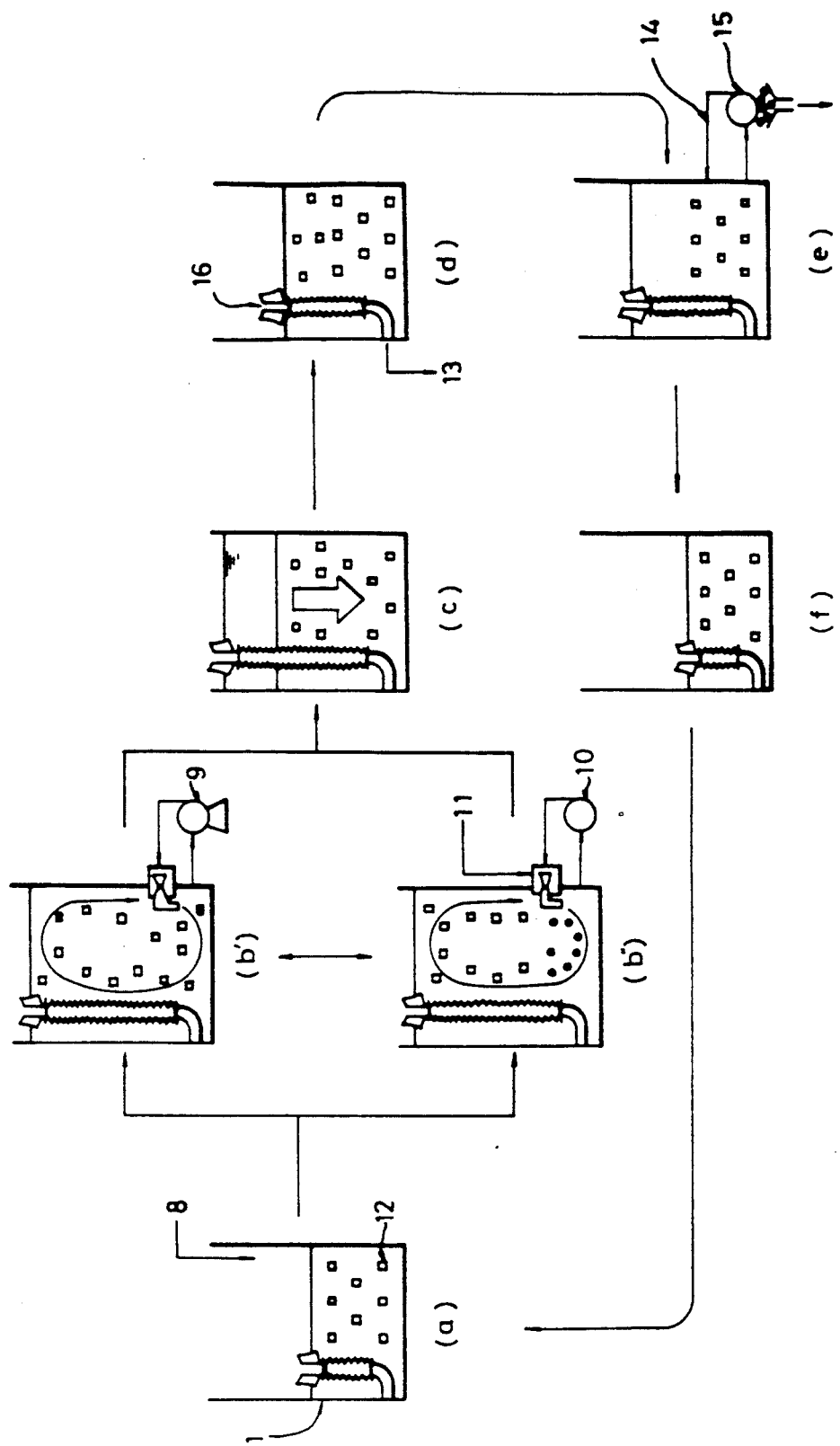
FIG. 2 is a flow diagram illustrating an embodiment of the biological method for treating wastewater according to the invention.

The biological method for treating wastewater according to the present invention is an improvement in the above prior art method and illustrated in FIG. 2.

The method according to the invention comprises the steps of:

a) introducing wastewater, together with an amount of floating porous biomass carrier, into a batch reactor containing microorganisms, thereby the microorganisms being retained in a high concentration;

b) mixing and biologically reacting the wastewater with the microorganisms under aerobic, anoxic and/or anaerobic conditions which are sequentially provided in an appropriate order depending on the type of pollutant to be treated;

c) separating the resultant mixture into two phases by means of sedimentation;

d) draining the supernatant wastewater from the reactor;

e) removing a portion of the sludge which remains as the lower layer from the reactor; and f) allowing the reactor to stand until a fresh wastewater is introduced for the next run.

According to the invention, a porous biomass carrier 12 is added to a reactor 1 in an appropriate amount in view of the purpose of treatment, and then wastewater 8 to be treated is introduced into the reactor (Step a).

Then, while aerobic conditions (Step b") and anoxic or anaerobic conditions (Step b') are sequentially provided within the reactor 1 in an appropriate order depending on the type of pollutant to be treated, the wastewater and the microorganisms are mixed and subject to a biological reaction. A water pump 9 is used to provide anoxic or anaerobic conditions within the reactor. Aerobic conditions can be provided by means of an aerator 10 alone or together with a water pump.

The aerator 10 used should be powerful enough to mix the contents of the reactor 1 thoroughly and supply a required amount of oxygen. When using a micro-aerator with a high oxygen efficiency as the aerator 10, a recycling pump 11 should also be used. A carrier protector (not depicted in the drawing) may be preferably installed to the inner side of the reactor so that the pump is not impaired. In addition, it is preferred to provide a lining to the inside of the reactor in order to prevent the reactor from abrasion.

The resultant mixture is then subject to sedimentation (Step c). In this step, while the operation of aerator 10 and/or the water pump is stopped (i.e., stagnation state), the microorganisms which are floating or attached to the carrier are separated from the treated wastewater by means of gravitational sedimentation. After phase separation, an amount of the supernatant wastewater 13 is removed through a movable drain tube 16 positioned at the upper portion of the reactor (Step d). The amount of wastewater removed is preferably within the range of 30-80% based on the amount of wastewater introduced.

Figure 3:
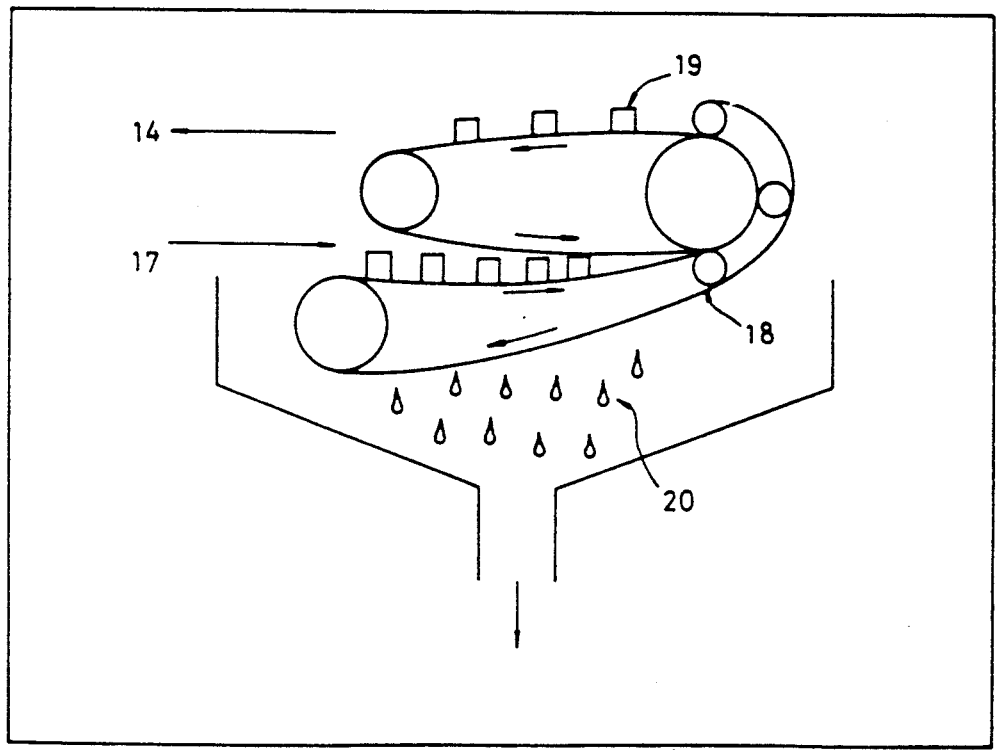
FIG. 3 is a schematic view of the apparatus used for treating sludges according to the invention, in which the carrier is separated from the resultant microorganism sludges to remove the sludges in a high concentration, and the microorganism carrier thus separated is recycled to the reactor.

The sludge and carrier retained in the reactor as the lower layer are then removed from the reactor, thereby the amount of the microorganisms within the reactor being adjusted to an appropriate level (Step e). The sludge and the carrier thus removed are then transferred to a sludge treating equipment 15 as depicted in FIG. 3. In this equipment, carrier 17 in admixture with sludge is passed through a gauge belt 18 where the carrier is separated and sludge 20 is concentrated. The carrier 19 thus separated is recycled to the reactor. The sludge separated in the equipment undergoes the conventional procedures for sludge treatment.

After the removal of sludge and before the introduction of fresh wastewater for the next run, the reactor is allowed to stand (Step f). During this time period, the reactor 1 may be either in a stagnation state or operated in the same manner as in Step (b') and/or Step (b").

As described hereinabove, the biological method of treating wastewater according to the invention is featured by the addition of an amount of floating porous biomass carrier which can be mixed thoroughly with wastewater to a batch reactor. By making use of the carrier according to the invention, the concentration of the microorganisms within the reactor can be increased to above 10,000 mg/L and the mass transfer can be adjusted so that various phases of microorganisms may be provided within the reactor.

Another feature of the method according to the present invention is that aerobic, anoxic and/or anaerobic conditions are sequentially provided within the reactor in an appropriate order so as to ensure efficient removal of the organic substances, and nitrous and phosphorus materials.

In addition, since the sludge resulted from the method according to the present invention has a high concentration, the expense for conducting the subsequent sludge treatment can be reduced greatly.

Further, the method according to the present invention can be carried out in a small reactor, resulting in less capital investment.

What is claimed is:

1. A biologic method of treating wastewater which comprises the steps of:
   a) introducing wastewater into a batch reactor in which an amount of floating porous biomass carrier has been previously added to render microorganisms retained in a high concentration;
   b) mixing and biologically reacting the wastewater with the microorganisms under aerobic, anoxic and/or anaerobic conditions which are provided sequentially in an appropriate order depending on the type of pollutant to be treated, the reactor being provided sequentially with anaerobic, anoxic and aerobic conditions by adjusting the amount of air introduced and the mixing intensity;
   c) separating the resultant mixture into two phases by means of sedimentation;
   d) draining the supernatant wastewater from the reactor;
   e) removing a portion of the sludge which remains as the lower layer from the reactor; and
   f) allowing the reactor to stand until a fresh wastewater is introduced for the next run.

2. The method of claim 1, wherein the biomass carrier is not decomposed by the microorganisms used and has a sufficient durability to use it repeatedly after removing the sludge.

3. The method of claim 1, wherein the biomass carrier is in the form of cubes having a density of 0.1 to 1.0, a porosity of 40 to 98%, a pore diameter of 10 to 3,000 $\mu$m, and a side length of 0.5 to 2.0 cm, or in the form of a corresponding sphere.

4. The method of claim 1, wherein the biomass carrier is made from polymeric materials containing additives having adsorbability or ion exchange capacity.

5. The method of claim 1, wherein the biomass carrier is added to the reactor in am amount of 5 to 40% by volume based on the volume of the reactor, depending on the type of pollutant to be treated.

6. The method of claim 1, wherein the aerobic condition is provided by supplying air or pure oxygen to the reactor through an aerator, and the anoxic and anaerobic conditions are provided to the reactor by using a water pump.

7. The method of claim 1, wherein the sedimentation is performed by stopping the operation of a water pump or the blowing of air.

8. The method of claim 1, wherein the sludge removed in Step (e) is passed through a gauze belt where the carrier is separated from the sludge and recycled to the reactor.

9. The method of claim 5, wherein the biomass carrier is added to the reactor in an amount of 10 to 30% by volume based on the volume of the reactor, depending on the type of pollutant to be treated.

* * * * *